United States Patent
Stewart

(10) Patent No.: US 9,231,932 B2
(45) Date of Patent: Jan. 5, 2016

(54) MANAGING REMOTE TELEPHONY DEVICE CONFIGURATION

(71) Applicant: Metaswitch Networks Ltd, Enfield, Middlesex (GB)

(72) Inventor: Mark Stewart, Enfield (GB)

(73) Assignee: METASWITCH NETWORKS LTD, Enfield (GB)

(*) Notice: Subject to any disclaimer, the term of this patent is extended or adjusted under 35 U.S.C. 154(b) by 142 days.

(21) Appl. No.: 13/955,832

(22) Filed: Jul. 31, 2013

(65) Prior Publication Data

US 2014/0041004 A1    Feb. 6, 2014

(30) Foreign Application Priority Data

Jul. 31, 2012 (GB) .................................. 1213588.5

(51) Int. Cl.
*G06F 7/04* (2006.01)
*H04L 29/06* (2006.01)
*H04L 29/08* (2006.01)
*H04M 7/00* (2006.01)

(52) U.S. Cl.
CPC ............... *H04L 63/08* (2013.01); *H04L 63/06* (2013.01); *H04L 67/34* (2013.01); *H04M 7/0078* (2013.01)

(58) Field of Classification Search
CPC ............................... G06F 21/31; H04L 63/08
USPC .......................................................... 726/7
See application file for complete search history.

(56) References Cited

U.S. PATENT DOCUMENTS

| | | | |
|---|---|---|---|
| 2005/0160175 | A1 | 7/2005 | Ho |
| 2009/0171767 | A1* | 7/2009 | Kolessar ..................... 705/10 |
| 2010/0103843 | A1 | 4/2010 | Carrillo et al. |
| 2010/0306352 | A1 | 12/2010 | Pritikin et al. |
| 2011/0067096 | A1 | 3/2011 | Chakarapani et al. |
| 2011/0161659 | A1 | 6/2011 | Himawan et al. |
| 2012/0174197 | A1* | 7/2012 | Klein et al. ..................... 726/5 |

FOREIGN PATENT DOCUMENTS

| | | |
|---|---|---|
| EP | 2 270 656 A1 | 1/2011 |
| GB | 2 436 658 A | 10/2007 |

* cited by examiner

*Primary Examiner* — Anthony Brown
(74) *Attorney, Agent, or Firm* — EIP US LLP

(57) ABSTRACT

The remote configuration of a telephony device is managed by transmitting configuration data to the device. The data is transmitted via a data communication network. One of more service credentials are received. The credentials are authenticated. A configuration time period is activated in response to authentication of the credentials. A request for configuration data is received via the network, which includes identification data indicative that the request is from a telephony device associated with the credentials. It is determined how to proceed with processing of the request dependent on whether the request is received during the time period. If so, configuration data is transmitted via the network in response to the request. If the request is received after the time period, transmission of configuration data via the network in response to the request is inhibited.

14 Claims, 2 Drawing Sheets

MANAGING REMOTE TELEPHONY DEVICE CONFIGURATION

CROSS REFERENCE TO RELATED APPLICATIONS

This application claims priority to foreign patent application no. GB 1213588.5 filed Jul. 31, 2012, the disclosure of which is incorporated herein by reference in its entirety.

TECHNICAL FIELD

The present invention relates to a method of and apparatus for remotely managing the remote configuration of a telephony device and to a computer program product which can cause a computerized device to perform the method.

BACKGROUND

Telephony devices such as Session Initiation Protocol (SIP) telephones need significant configuration in order to operate. Various systems exist, such as the SIP Provisioning Server available from Metaswitch Networks Ltd of 100 Church Street, Enfield, EN2 6BQ, UK, to allow a service provider to remotely manage the configuration of a SIP telephone on behalf of a user. Typically, this involves a SIP client running on the telephone retrieving one or more files containing its configuration from a central system such as the SIP Provisioning Server. Usually, one of the retrieved configuration files contains the SIP credentials for the client to use. For hard telephones, the file is usually identified using the Media Access Control (MAC) address of the telephone that is to be configured. For example, the file may be named 001122334455.cfg.

In an insecure provisioning solution design, an attacker that correctly determines, or even guesses, the filename of the configuration for a particular user can obtain the configuration file and thereby make fraudulent calls using the SIP credentials. This is particularly easy if the attacker can discover the MAC address of the user's telephone. The attacker may be able to do this by, for example, physically accessing the telephone, the Local Area Network (LAN) in which the telephone is connected, or on discarded packaging. It is, in any case, not difficult for an attacker to determine candidate MAC addresses because blocks of MAC addresses are assigned to particular phone vendors, and so the search space is relatively small.

Various mechanisms are available that can provide secure provisioning, each with their own merits and limitations.

One existing mechanism relies on the use of a manufacturer firmware secret in which configuration files are encrypted and can be decrypted using a key stored in the telephone. Although configuration files may be encrypted, the configuration files may be protected by a master key in the telephone's firmware. One security concern with this approach is that any publication of the details of the encryption algorithm including the master key would compromise all deployments of such telephones. A more practical limitation with this approach is that it is very specific to the particular vendor and would require custom development work on a provisioning server to integrate the vendor-specific encryption tools.

Another existing mechanism relies on the use of a pre-configured secret. Telephones are configured with the secret (for example a decryption key) prior to shipping to the customer premises. This mechanism requires the service provider (or their agent) to perform a secure "staging" step which typically involves unboxing the phones supplied from the vendor. This significantly increases the cost of deploying these phones in a secure manner. The staging step provides an opportunity for unauthorized disclosure of the secret, potentially compromising the overall security of the deployment. Furthermore, if a deployed phone ever loses its secret (for example if the user returns it to factory default), the phone needs to be returned to the service provided to be re-staged. Although phone vendors tend to use "standard" encryption algorithms, they tend to choose different algorithms (for example 3DES, AES etc.), increasing the vendor-specific work required on the provisioning server.

Another mechanism, is to collect user credentials. This solution is currently used with CommPortal Communicator, available from Metaswitch Network Ltd, and requires that the SIP client locally implement a mechanism to collect credentials from the user. However, many hard phones do not offer this capability in a form in which it is easy for a user to enter this information. For example, the user may be required to connect the phone to a network, identify the IP address assigned to the phone, enter this IP address into a web browser running on a computer connected to the same network, log into a configuration application running on the phone using a default password and navigate to the relevant fields before the user credentials can be entered.

Another way to provide secure provisioning relies on the use of client-side certificates. Some vendors program a unique certificate into the phone during manufacture which the server can use to verify that the request has actually originated from the device with the relevant MAC address. This potentially offers good levels of security, however there are some practical limitations. Few phone vendors support this in practice as it requires hardware support in the phone to store the certificate and complicates the manufacturing process. Typically, the client certificate is verified using mechanisms provided by HTTPS. In some deployment scenarios, a reverse proxy may be deployed between the phone and the provisioning server. Since the reverse proxy terminates the HTTPS flow, additional integration is needed between the reverse proxy and the provisioning server, which tends to be specific to the reverse proxy.

Another mechanism is to supply the user with credentials in a physical module such as a SIM card. Whilst this mechanism is widely used in mobile networks, it is not supported by typical "wireline" hard phones.

US-A1-2011/0067096 describes a system and method for providing secure configuration file exchange A Voice over Internet Protocol (VoIP) device receives an encrypted first configuration file from a server using a default Uniform Resource Locator (URL), which is decrypted using a default key stored in the VoIP device. The default URL and the default key are updated with a new URL and a new key stored in the first configuration file. The VoIP device receives an encrypted second configuration file from the server using the new URL, decrypts the second configuration file using the new key and applies a set of profile parameters stored in the second configuration file to provide network service from the server to a customer premise equipment (CPE) communicatively coupled to the VoIP device. Thus, this system relies upon the VoIP device already having the default key stored in it in advance to be able to decrypt the first configuration file.

The existing systems described above typically rely upon the telephone that is being provisioned supporting certain functions and also no single security mechanism is widely supported across phone vendors. This means that a provisioning server needs to implement different security strategies for each different phone vendor.

It would therefore be desirable to be able to provide improvements in remotely managing the remote configuration of a telephony device. In particular, it would be desirable to provide improvements in remotely managing the configuration of a telephony device in a secure manner, which places minimal requirements on the telephony device being configured.

SUMMARY

According to a first aspect of the invention, there is provided a method of remotely managing the remote configuration of a telephony device by transmitting configuration data to the telephony device, the configuration data being transmitted via a data communication network, the method comprising:

receiving one or more service credentials;
authenticating the service credentials;
activating a configuration time period in response to authenticating the service credentials;
receiving, via the data communication network, a request for configuration data which includes identification data which is indicative that the request is from a telephony device associated with the service credentials:
determining how to proceed with processing of the request dependent on whether the request is received during the configuration time period,
wherein if the request is received during the configuration time period the processing of the request includes transmitting configuration data via the data communication network in response to the request, and
if the request is received after the configuration time period the processing of the request includes inhibiting the transmission of configuration data via the data communication network in response to the request.

According to a second aspect of the invention, there is provided apparatus for remotely managing the remote configuration of a telephony device by transmitting configuration data to the telephony device, the configuration data being transmitted via a data communication network, the apparatus being configured to:

receive one or more service credentials;
authenticate the service credentials;
activate a configuration time period in response to authenticating the service credentials:
receive, via the data communication network, a request for configuration data which includes identification data which is indicative that the request is from a telephony device associated with the service credentials;
determine how to proceed with processing of the request dependent on whether the request is received during the configuration time period,
wherein if the request is received during the configuration time period the processing of the request includes transmitting configuration data via the data communication network in response to the request, and
if the request is received after the configuration time period the processing of the request includes inhibiting the transmission of configuration data via the data communication network in response to the request.

According to a third aspect of the invention, there is provided a computer program product comprising a non-transitory computer-readable storage medium having computer readable instructions stored thereon, the computer readable instructions being executable by a computerized device to cause the computerized device to perform a method of remotely managing the remote configuration of a telephony device by transmitting configuration data to the telephony device, the configuration data being transmitted via a data communication network, the method comprising:

receiving one or more service credentials;
authenticating the service credentials;
activating a configuration time period in response to authenticating the service credentials;
receiving, via the data communication network, a request for configuration data which includes identification data which is indicative that the request is from a telephony device associated with the service credentials;
determining how to proceed with processing of the request dependent on whether the request is received during the configuration time period,
wherein if the request is received during the configuration time period the processing of the request includes transmitting configuration data via the data communication network in response to the request, and
if the request is received after the configuration time period the processing of the request includes inhibiting the transmission of configuration data via the data communication network in response to the request.

Further features and advantages of the invention will become apparent from the following description of preferred embodiments of the invention, given by way of example only, which is made with reference to the accompanying drawings.

DETAILED DESCRIPTION

Figure 1:
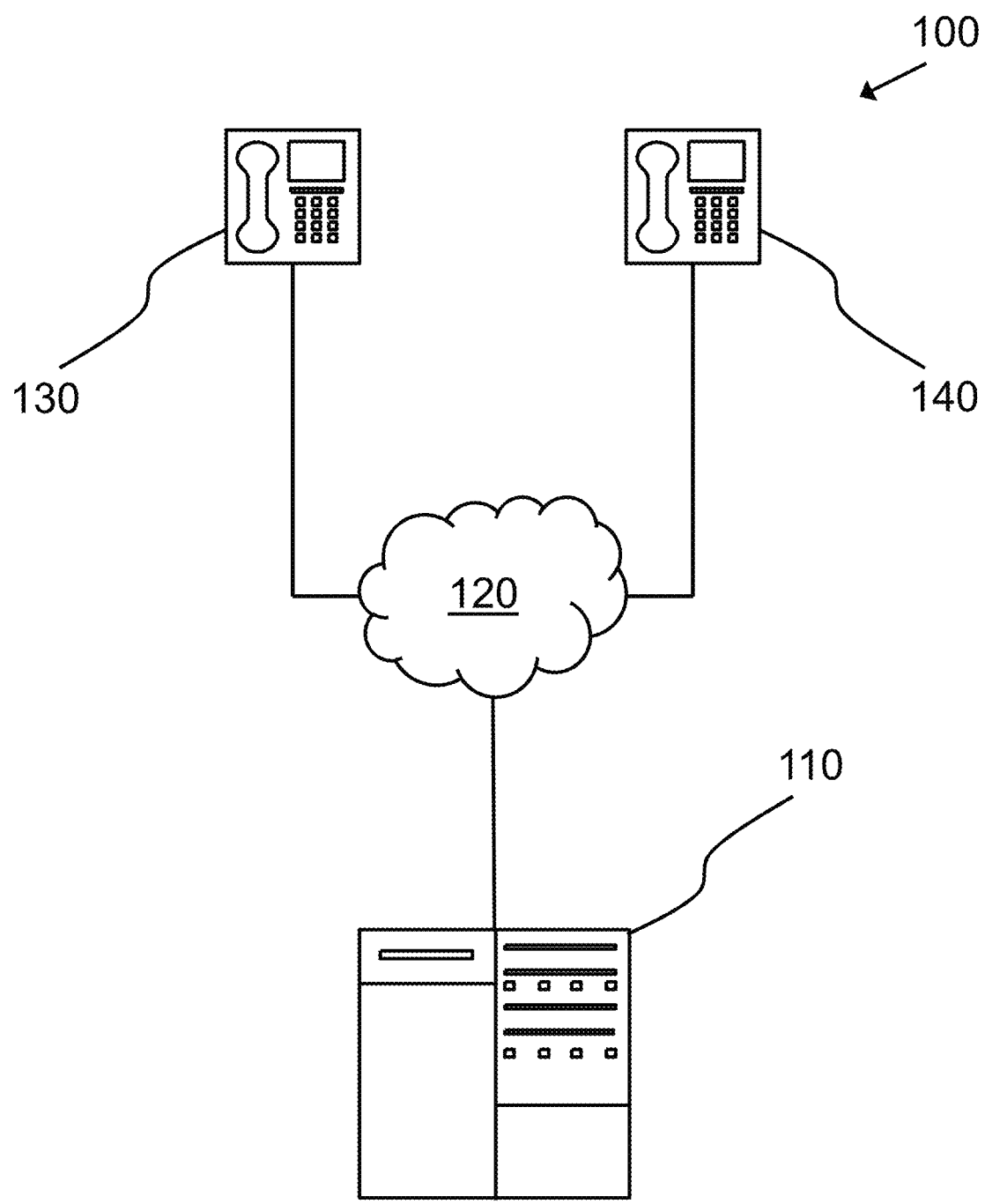
FIG. 1 is a schematic representation of a communications system in accordance with some embodiments.

FIG. 1 is a schematic representation of a communications system 100 in accordance with some embodiments. The communications system 100 may be used to remotely manage the remote configuration of a telephony device.

The communications system 100 includes a provisioning server system 110. The provisioning server system 110, referred to hereinafter as the provisioning server 110, may comprise one or more servers which may be located in one or more physical locations. The provisioning server 110 is used by a telephony service provider to remotely configure telephony devices so that they can be used to access the telephony service.

The provisioning server 110 is connected to a data communications network 120 via which it communicates with a plurality of telephony devices 130, 140. The network 120 may comprise an Internet Protocol (IP) network, such as the Internet or another suitable type of network. The telephony devices 130, 140 may comprise hard telephones and/or soft telephones.

The telephony device 130 may be provisioned with configuration data using a mechanism that places minimal requirements on the telephony device 130. In some cases, the telephony device may be provisioned in its factory-default state. In some embodiments, the telephony device 130 does not need any prior secret information in order to decode the configuration data sent to it.

As will be explained in more detail below, an action is performed which temporarily allows retrieval of the configuration data by the telephony device 130. The telephony device 130 is triggered to retrieve its configuration data. The provisioning server 110 returns configuration data to the telephony device 130. After a short period of time (for example, one minute) after the temporary retrieval of the configuration data has been allowed, the provisioning server 110 inhibits further disclosure of the configuration data. The provisioning server 110 may inhibit disclosure of the configuration data in response to transmitting the configuration to the telephony device 130 to inhibit, for example, the configuration being sent to telephony device 140.

Temporarily enabling the retrieval of the configuration data by a device that requests it theoretically provides a way for an attacker to retrieve the configuration data. However, the time window is selected to be sufficiently small that this is impractical in practice because the attacker would need to fake a request for the configuration data during the time window and would also need to identify the particular configuration file for it to be retrieved.

The configuration data may include secret information, such as one or more security tokens, and instructions to telephony device 130 to use the secret information in subsequent configuration retrievals. The provisioning server 110 may restrict access to further configuration data to devices having the secret information, for example by requiring the device to present the secret information to the provisioning server 110 to retrieve the configuration data or by encrypting the configuration data so that the secret information is required to decrypt the encrypted configuration data.

Figure 2:
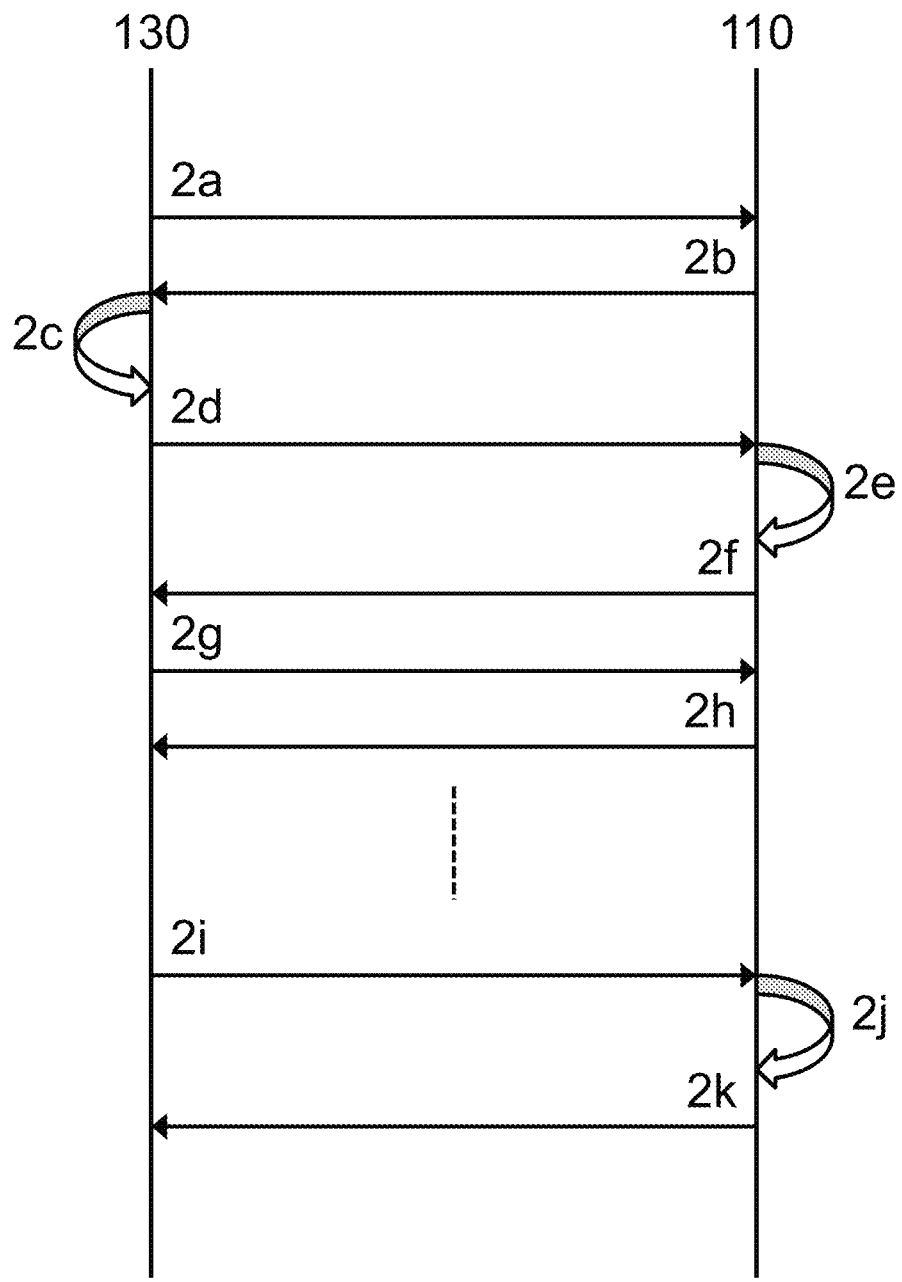
FIG. 2 is a message flow diagram illustrating a method in accordance with some embodiments.

FIG. 2 is a message flow diagram showing a method in accordance with some embodiments. The method may be used to remotely manage the remote configuration of a telephony device.

In some embodiments, at least some of these steps are performed via a self-provisioning service.

At step 2a, a factory default telephony device 130 discovers the URL of the provisioning server 110, for example by using the Dynamic Host Configuration Protocol (DHCP) and requests its configuration file from the provisioning server 110.

At step 2b, the provisioning server 110 returns a configuration file that configures the telephony device 130 to run a self-provisioning service. The configuration file need not be secured since it does not contain any sensitive information.

The self-provisioning service may be implemented in various different ways.

For example, the self-provisioning service may be implemented using a mini-browser on the telephony device 130 which renders served up pages on a display screen on the telephony device 130. These pages may be in a vendor-proprietary Extensible Markup Language (XML) format.

Alternatively, the telephony device 130 may establish a Session Initiation Protocol (SIP) session with an Interactive Voice Response (IVR) provided by the provisioning server 110 using a restricted SIP account. This implementation has the benefit of not requiring the telephony device 130 to have a screen and and/or support browser-like capabilities.

At step 2c, the self-provisioning service prompts for service credentials, such as a telephone number and a Personal Identification Number (PIN).

At step 2d, the telephony device 130 transmits the service credentials to the provisioning server 110. The provisioning server 110 thus receives the service credentials, from the telephony device 130.

At step 2e, the provisioning server 110 authenticates the service credentials. On positive authentication, the provisioning server 110 temporarily enables temporary retrieval of the configuration data. The provisioning server 110 may activate a timer in response to authenticating the service credentials.

At step 2f, the provisioning server 110 transmits an instruction to trigger the telephony device 130 to retrieve a new set of configuration. Depending upon the capabilities of the telephony device 130, the self-provisioning application may be able to trigger the telephony device 130 to request the configuration data automatically, for example by transmitting a message with a particular flag set or which includes a predetermined parameter which causes the telephony device 130 to request the configuration data. Requesting the configuration data may or may not involve causing the telephony device 130 to reboot itself. Instead of automatically triggering the telephony device 130, the user may be prompted, for example via a display screen or via the SIP session, to perform a manual step such as rebooting the telephony device 130.

The configuration time period during which the configuration data is made available for retrieval may be selected so that it would allow sufficient time for the telephony device 130 be triggered to request the configuration data (which may involve manually or automatically rebooting the telephony device 130).

At step 2g, the telephony device 130 transmits the request for the configuration data. The request transmitted at step 2g may or may not be the same as the request transmitted at step 2a.

The provisioning server 110 receives the request for configuration from the telephony device 130. The provisioning server 110 determines whether the request has been received within the configuration time period. If the request has been received within the configuration time period, the provisioning server 110 supplies the configuration data, for example SIP credentials associated with a service account associated with the service credentials, at step 2h.

In some embodiments, the configuration data is in a form in which information in the configuration data is readable by a requesting device when received by the requesting device. In other words, in such embodiments, although the configuration data may be encrypted for transportation over the network 120, once successfully received, a further, pre-existing decryption key is not required to decrypt the configuration data. This places minimal requirements on the telephony device associated with the service credentials for reading the information in the configuration data but also means that it is possible for other telephony devices to read the information in the configuration data. It will be appreciated that, although the configuration data may be in a form in which information in the configuration data is readable once the configuration data is received, other encryption, such as HTTPS, may be used, for example, to protect against man-in-the-middle attacks. In such cases, the configuration data would be encrypted as it is transported over the network 120, but the encryption key is dynamically established as part of an HTTPS handshake and is not pre-existing prior to the establishment of the HTTPS connection. In such cases, although only the originator of the request would be able to read the data (in other words eavesdropping during transport would be thwarted because the configuration data is encrypted during transport), the request may have originated from a device other than device 130 (for example it may have originated from device 140) and, once received by that device 140, may be used without requiring the device 140 to perform further decryption of the received data.

It is possible that the provisioning server 110 receives a request for the configuration data from the telephony device 140 during the configuration time period and responds to the request from the telephony device 140 with the configuration data. Thus, there is a risk that the telephony device 140 will receive the configuration data in a form that it can process without requiring a decryption key. As explained above, although this mechanism, particularly the sending of the configuration data in a manner such that a recipient telephony device does not need any prior secret information in order to decode the configuration data, theoretically provides a way for an attacker to retrieve the secret information, the time window for doing so limits this in practice. However, the telephony device 140 would need to masquerade as telephony device 130 (for example by requesting the configuration file for telephony device 130) during the configuration time period. Thus, the risk is only present if the telephony device 140 is aware of the identity of the telephony device 130 and requests the configuration data associated with the telephony device 130 during the configuration time period.

The configuration data sent to the telephony device 130 at step 2h may also comprise the secret information, for example in the form of one or more security tokens.

In some embodiments, the provisioning server 110 may be configured only to transmit further configuration data to a requesting device in response to receiving the security token or data derived therefrom from the requesting device. This means that the further configuration data is only made available to a requesting device that can present the security token or data derived therefrom to the provisioning server 110. The requesting telephony device may be required to present the security token itself or may be able to present data derived from the security token, for example a hash of the security token, to the provisioning server 110 to be able to receive the further configuration data. If the requesting telephony device is unable to supply the security token, for example if it is reset to its factory default, the requesting telephony device is supplied with configuration to run the self-provisioning application and the sequence starts over again.

In some embodiments, the security token forms at least part of a URL that identifies a location at which the further configuration data is accessible to the requesting device. The security token may be used to update or replace the default URL that the telephony device 130 uses to retrieve configuration to include a randomly generated security token.

In some embodiments, the security token comprises a decryption key. In such embodiments, the provisioning server 110 transmits further configuration data in an encrypted form to a requesting device, where the requesting device requires the decryption key to decrypt the encrypted further configuration data.

In some embodiments, the provisioning server 110 inhibits further transmission of the configuration data in response to transmitting the configuration data during the configuration time period.

Some time later, at step 2i, the provisioning server 110 receives a request for further configuration data. In cases where the configuration data is identified using the MAC address of the telephony device 130, the request may identify the MAC address of the telephony device 130. In other cases, the request identifies the requested configuration data in an appropriate manner In some embodiments, the provisioning server 110 is configured only to respond to the request with the further configuration data if the request includes the security token that was sent to the phone at step 2h.

On this occasion, the request for the further configuration data was received from the telephony device 130 and included the required security token. At step 2j, the provisioning server 110 generates a new secure token, different to the secure token that was sent to the telephony device 130 at step 2h, and sends the new secure token to the telephony device along with the further configuration data at step 2k. The provisioning server 110 may generate new secure tokens to be sent with subsequent configuration data in this manner.

The provisioning server 110 inhibits transmission of the configuration data after the configuration time period. The configuration data may be made available again at a later stage. For example, the telephony device 130 may not have submitted a request for the configuration data within the configuration time period, for instance the telephony device 130 may not have been triggered to request the configuration data, its rebooting may have taken unusually long, the telephone device 130 may have been inadvertently disconnected from the network 120 or such like. Authentication may take place again and the configuration data may again be temporarily made available.

As such, the provisioning server 110 remotely provisions a telephony device 130 with configuration data using a mechanism which places minimal requirements on the phone, making it applicable to the factory-default state provided by most phone vendors.

To further mitigate the risk of an attacker obtaining the configuration data during the configuration time period during which the provisioning server 110 responds to requests for the configuration data, one or more of the following techniques may be used in which at least one further criterion is used to further limit transmission of the configuration data.

The self-provisioning service could be disabled or throttled, or could blacklist certain IP addresses during periods of unusually high levels of configurations requests which are not accompanied by a correct security token since this may indicate that an attacker is attempting to use brute-force scanning techniques in the hope of retrieving configuration data that has temporarily been made available for retrieval. Although this action may deny or restrict users provisioning new phones with the self-provisioning service, existing phones with a security token would be unaffected and would still be able to retrieve updated configuration.

The provisioning server 110 may also be configured only to return the configuration data if the request for it has originated from the same telephony device that was used to access the self-provisioning service by restricting transmission of the configuration data to a device having the same IP address as the device that was used to access the self-provisioning service. However, IP addresses are not generally suitable for permanently authenticating requests since they may change over time. Nevertheless, they are likely to remain stable during the above sequence and therefore may be suitable for this purpose.

The provisioning server 110 may also be configured only to return the configuration data if the request for it has originated from a pre-approved IP address. This IP address might correspond to a segment of the network in which the user might typically be expected to reside, for example corresponding to their home location. This closes the window to an arbitrary attacker located on the Internet, restricting the window to somebody with a connection to this network. Requests for further configuration data need not be subject to the same restrictions, allowing the user to subsequently change location after the initial provisioning.

In a Hosted private branch exchange (PBX) environment, the URL configured into the on-site DHCP server may include a Business Group-specific security token. The per-phone/user configuration data is only disclosed if the requested URL includes the Business Group security token. This closes the window to an arbitrary attacker located on the Internet, restricting the window to somebody with a connection to the Business Group.

The particular form of the security token and corresponding validation method in relation to the security token may take forms other than a security token in a URL. For example, the security token may comprise a password that the provisioning server 110 can authenticate, for example using HTTP Digest. The security token may comprise an HTTPS client certificate which the provisioning server 110 can authenticate.

Various measures (for example a method, apparatus and computer program product) of or for remotely managing the remote configuration of a telephony device by transmitting configuration data to the telephony device are provided. The configuration data is transmitted via a data communication network. One or more service credentials are received. The service credentials are authenticated. A configuration time period is activated in response to authenticating the service credentials. A request for configuration data is received via the data communication network. The request includes identification data which is indicative that the request is from a telephony device associated with the service credentials. It is determined how to proceed with processing of the request dependent on whether the request is received during the configuration time period. If the request is received during the configuration time period, the processing of the request includes transmitting configuration data via the data communication network in response to the request. If the request is received after the configuration time period, the processing of the request includes inhibiting the transmission of configuration data via the data communication network in response to the request.

In some embodiments, the configuration data comprises access information for accessing a service associated with the service credentials.

In some embodiments, the configuration data is in a form in which information in the configuration data is readable by a requesting device when received by the requesting device.

In some embodiments, the configuration data comprises a security token.

In some embodiments, a request for further configuration data is received from a requesting device, and the further configuration data is transmitted to the requesting device in response to receiving the security token or data derived therefrom from the requesting device.

In some embodiments, the security token comprises a decryption key. A request for further configuration data is received from a requesting device, and the further configuration data is transmitted in an encrypted form to the requesting device. The requesting device requires the decryption key to decrypt the encrypted further configuration data.

In some embodiments, further transmission of the configuration data is inhibited in response to transmitting the configuration data during the configuration time period.

In some embodiments, a telephony device from which the service credentials are received is associated with the service credentials.

In some embodiments, an instruction is transmitted to the telephony device to trigger the telephony device to transmit a request for the configuration data.

In some embodiments, at least one further criterion is used to determine how to proceed with processing of the request.

In some embodiments, the configuration data is useable by the telephony device to run a self-configuration service.

The above embodiments are to be understood as illustrative examples of the invention. Further embodiments of the invention are envisaged.

For example, in scenarios where a self-provisioning is unavailable, the user, or an administrator acting on their behalf, can use a web portal or another mechanism to trigger the temporary retrieval of the configuration. The web portal then provides the user with instructions to manually trigger the phone to retrieve its configuration.

In some embodiments, instead of transmitting the security token to the telephony device 130, the user could be prompted to enter the service credentials each time the telephony device 130 requests new configuration data to temporarily allow retrieval of further configuration data each the time further configuration is requested. This avoids the need to provision the telephony device 130 with a different security token each time new configuration data is requested, but potentially allows an attacker to retrieve the configuration data on each occasion on which the configuration data is temporarily made available for retrieval.

Although embodiments have been described above that relate to SIP telephones and SIP credentials, configuration of other types of telephony device are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of remotely managing the remote configuration of a telephony device by transmitting configuration data to the telephony device, the configuration data being transmitted via a data communication network, the method comprising:
   receiving one or more service credentials;
   authenticating the one or more service credentials;
   activating a configuration time period in response to authenticating the one or more service credentials;
   receiving, via the data communication network, a request for configuration data which includes identification data which is indicative that the request is from a telephony device associated with the one or more service credentials;
   determining how to proceed with processing of the request dependent on whether the request is received during the configuration time period,
   wherein if the request is received during the configuration time period the processing of the request includes transmitting configuration data via the data communication network in response to the request, and
   if the request is received after the configuration time period the processing of the request includes inhibiting the transmission of configuration data via the data communication network in response to the request.

2. A method according to claim 1, wherein the configuration data comprises access information for accessing a service associated with the one or more service credentials.

3. A method according to claim 1, wherein the configuration data is in a form in which information in the configuration data is readable by a requesting device when received by the requesting device.

4. A method according to claim 1, wherein the configuration data comprises a security token.

5. A method according to claim 4, comprising:
   receiving a request for further configuration data from a requesting device; and transmitting the further configuration data to the requesting device in response to receiving the security token or data derived therefrom from the requesting device.

6. A method according to claim 4, wherein the security token comprises a decryption key, the method comprising:
receiving a request for further configuration data from a requesting device; and
transmitting the further configuration data in an encrypted form to the requesting device, the requesting device requiring the decryption key to decrypt the encrypted further configuration data.

7. A method according to claim 5, wherein the security token comprises a decryption key, the method comprising:
receiving a request for further configuration data from a requesting device; and
transmitting the further configuration data in an encrypted form to the requesting device, the requesting device requiring the decryption key to decrypt the encrypted further configuration data.

8. A method according to claim 1, comprising inhibiting further transmission of the configuration data in response to transmitting the configuration data during the configuration time period.

9. A method according to claim 1, comprising associating a telephony device from which the one or more service credentials are received with the one or more service credentials.

10. A method according to claim 9, comprising transmitting an instruction to the telephony device to trigger the telephony device to transmit a request for the configuration data.

11. A method according to claim 1, comprising using at least one further criterion to determine how to proceed with processing of the request.

12. A method according to claim 1, wherein the configuration data is useable by the telephony device to run a self-configuration service.

13. Apparatus for remotely managing the remote configuration of a telephony device by transmitting configuration data to the telephony device, the configuration data being transmitted via a data communication network, the apparatus being configured to:
receive one or more service credentials;
authenticate the one or more service credentials;
activate a configuration time period in response to authenticating the one or more service credentials;
receive, via the data communication network, a request for configuration data which includes identification data which is indicative that the request is from a telephony device associated with the one or more service credentials;
determine how to proceed with processing of the request dependent on whether the request is received during the configuration time period,
wherein if the request is received during the configuration time period the processing of the request includes transmitting configuration data via the data communication network in response to the request, and
if the request is received after the configuration time period the processing of the request includes inhibiting the transmission of configuration data via the data communication network in response to the request.

14. A computer program product comprising a non-transitory computer-readable storage medium having computer readable instructions stored thereon, the computer readable instructions being executable by a computerized device to cause the computerized device to perform a method of remotely managing the remote configuration of a telephony device by transmitting configuration data to the telephony device, the configuration data being transmitted via a data communication network, the method comprising:
receiving one or more service credentials;
authenticating the one or more service credentials;
activating a configuration time period in response to authenticating the one or more service credentials;
receiving, via the data communication network, a request for configuration data which includes identification data which is indicative that the request is from a telephony device associated with the one or more service credentials;
determining how to proceed with processing of the request dependent on whether the request is received during the configuration time period,
wherein if the request is received during the configuration time period the processing of the request includes transmitting configuration data via the data communication network in response to the request, and
if the request is received after the configuration time period the processing of the request includes inhibiting the transmission of configuration data via the data communication network in response to the request.

* * * * *